US011100828B2

(12) United States Patent
Chen et al.

(10) Patent No.: US 11,100,828 B2
(45) Date of Patent: Aug. 24, 2021

(54) MEASUREMENT SYSTEM AND METHOD FOR MEASURING A RESPONSE TIME OF A LIQUID CRYSTAL DISPLAY

(71) Applicant: Realtek Semiconductor Corp., HsinChu (TW)

(72) Inventors: Yung-Chih Chen, HsinChu (TW); Wei-Chih Lin, HsinChu (TW); Jui-Te Wei, HsinChu (TW); Po-An Chen, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/113,117

(22) Filed: Dec. 7, 2020

(65) Prior Publication Data
US 2021/0183284 A1 Jun. 17, 2021

(30) Foreign Application Priority Data

Dec. 11, 2019 (TW) .................. 108145293

(51) Int. Cl.
*G09G 3/00* (2006.01)
*G09G 3/36* (2006.01)
(Continued)

(52) U.S. Cl.
CPC ............... *G09G 3/006* (2013.01); *G01J 1/44* (2013.01); *G09G 3/3607* (2013.01);
(Continued)

(58) Field of Classification Search
CPC .... G09G 3/006; G09G 3/3607; G09G 3/3696; G09G 3/3614; G09G 2320/103; G01J 1/44; G01J 2001/4247; G01J 2001/4413
(Continued)

(56) References Cited

U.S. PATENT DOCUMENTS

| 2003/0117131 A1 | 6/2003 | Ham |
| 2005/0125179 A1 | 6/2005 | Selby |
| 2007/0176871 A1* | 8/2007 | Tsai ..................... G09G 3/006 |
| | | 345/89 |

FOREIGN PATENT DOCUMENTS

| TW | M367334 U1 | 10/2009 |
| TW | 201346879 A | 11/2013 |

OTHER PUBLICATIONS

Park,"Automated System for Response Time Optimization and Flicker Reduction in LCD Manufacturing", SID 05 Digest, pp. 1797-1799, 2005.

(Continued)

*Primary Examiner* — Amare Mengistu
*Assistant Examiner* — Gloryvid Figueroa-Gibson
(74) *Attorney, Agent, or Firm* — Winston Hsu

(57) ABSTRACT

A measurement system has a photosensitive element, an analog-to-digital converter (ADC), a reference voltage source, and a transmission interface. The photosensitive element senses variations of brightness of a display panel of a liquid crystal display (LCD) to generate a voltage signal. The ADC converts the voltage signal into a digital signal. The reference voltage source provides a reference voltage to the ADC to drive the ADC to dynamically adjust a convertible voltage range of the ADC for any voltage inputted to the ADC according to the reference voltage. The transmission interface transmits the digital signal to a computer to trigger the computer to calculate a response time of the LCD according to the digital signal.

19 Claims, 5 Drawing Sheets

(51) Int. Cl.
  *G01J 1/44* (2006.01)
  *G01J 1/42* (2006.01)
(52) U.S. Cl.
  CPC .... *G09G 3/3696* (2013.01); *G01J 2001/4247* (2013.01); *G01J 2001/4413* (2013.01); *G09G 3/3614* (2013.01); *G09G 2310/0243* (2013.01); *G09G 2320/103* (2013.01)
(58) Field of Classification Search
  USPC ........................................................ 345/690
  See application file for complete search history.

(56) References Cited

OTHER PUBLICATIONS

Adam, "A simple LCD response time measurement based on a CCD line camera", Asia Display, Shangai, China. pp. CD. Mar. 2007.

* cited by examiner

MEASUREMENT SYSTEM AND METHOD FOR MEASURING A RESPONSE TIME OF A LIQUID CRYSTAL DISPLAY

BACKGROUND OF THE INVENTION

1. Field of the Invention

The present invention relates to a measurement system and a method for measuring a response time of a liquid crystal display (LCD), in particular to a measurement system and a method for measuring the response time of the LCD through dynamically adjusting a convertible voltage range of an analog-digital-converter (ADC) of the LCD.

2. Description of the Prior Art

The response time of a liquid crystal display (LCD) refers to the time it takes for liquid crystals in the LCD to transition, and the response time will directly affect the user's viewing experience. In recent years, the LCDs will specifically mark their own response time. For manufacturers or users, a response time measurement system suitable for product development or product verification is indispensable.

At present, there are instruments on the market that can measure the response time of a display, but their cost is often quite expensive, which is not affordable by the ordinary users. In addition, the accuracy of devices that measure LCD response time cannot be adjusted dynamically. Therefore, a device and a method that can dynamically adjust the accuracy and measure the response time of the LCD are needed.

SUMMARY OF THE INVENTION

An embodiment provides a method for measuring a response time of a liquid crystal display (LCD). The method comprises: transmitting a display signal to the LCD to drive the LCD to display images according to the display signal; a photosensitive element sensing variations of brightness of a display panel of the LCD to generate a voltage signal; converting the voltage signal into a digital signal by an analog-to-digital converter (ADC); a reference voltage source providing a reference voltage to the ADC to drive the ADC to dynamically adjust a convertible voltage range of the ADC for any voltage inputted to the ADC according to the reference voltage; transmitting the digital signal to a computer through a transmission interface; and the computer calculating the response time of the LCD according to the digital signal.

Another embodiment provides a measurement system for measuring a response time of a liquid crystal display (LCD). The LCD displays images according to a display signal. The measurement system comprises a photosensitive element, an analog-to-digital converter (ADC), a reference voltage source, and a transmission interface. The photosensitive element senses variations of brightness of a display panel of the LCD to generate a voltage signal. The ADC converts the voltage signal into a digital signal. The reference voltage source provides a reference voltage to the ADC to drive the ADC to dynamically adjust a convertible voltage range of the ADC for any voltage inputted to the ADC according to the reference voltage. The transmission interface transmits the digital signal to a computer to trigger the computer to calculate the response time of the LCD according to the digital signal.

In another embodiment, the measurement system further comprises an amplifying circuit for amplifying the voltage signal into an amplified voltage signal. The ADC converts the amplified voltage signal into the digital signal.

These and other objectives of the present invention will no doubt become obvious to those of ordinary skill in the art after reading the following detailed description of the preferred embodiment that is illustrated in the various figures and drawings.

DETAILED DESCRIPTION

The present invention provides architecture of a system for measuring the response time of a liquid crystal display (LCD), so that users can assemble a suitable measurement system through simple and easily available components.

Figure 1:
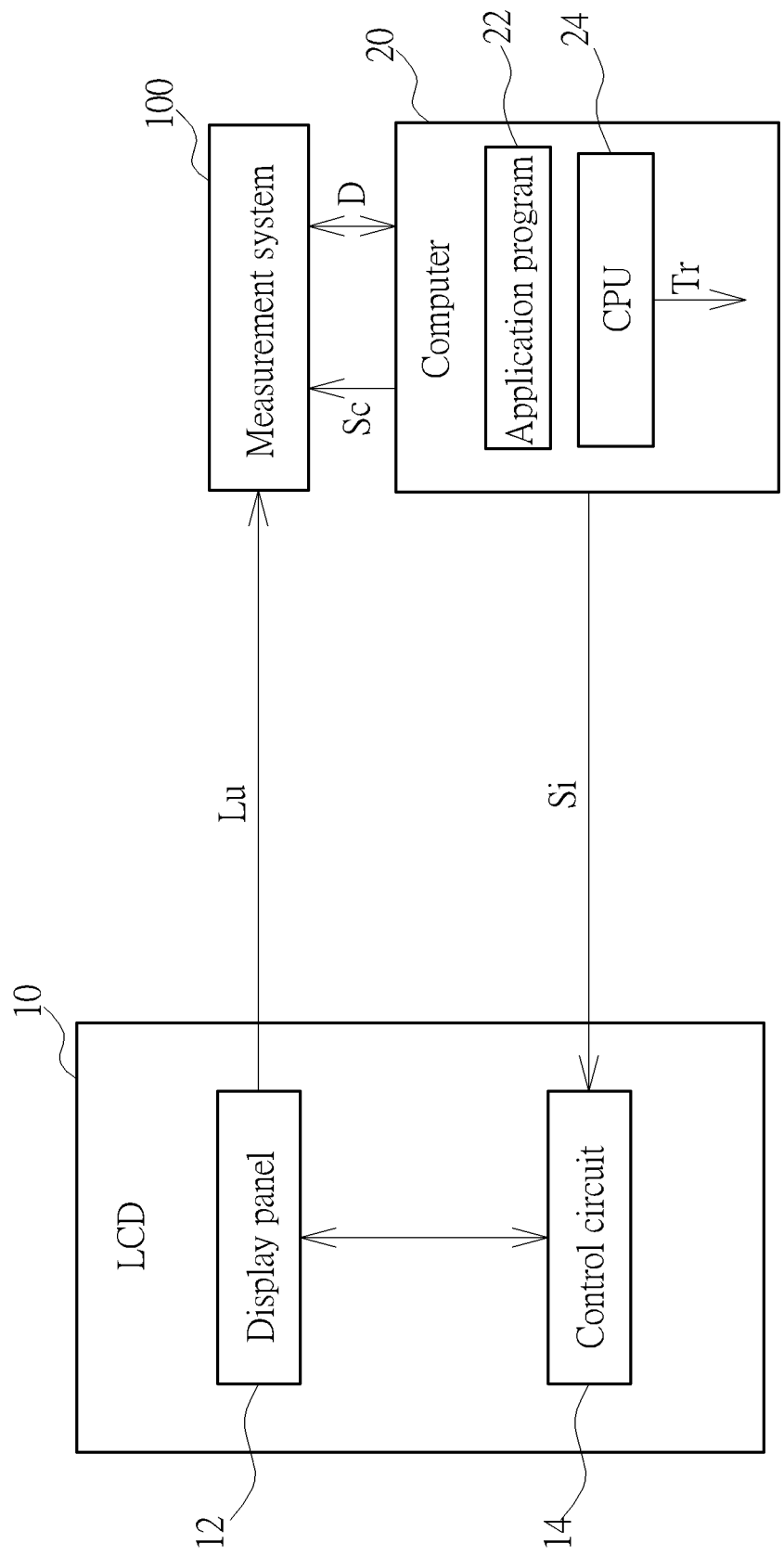
FIG. 1 is a functional block diagram of a measurement system according to an embodiment of the invention, a liquid crystal display to be tested, and a computer.

FIG. 1 is a functional block diagram of a measurement system 100 according to an embodiment of the present invention, an LCD 10 to be tested, and a computer 20. The measurement system 100 and the LCD 10 are coupled to the computer 20. The LCD 10 comprises a control circuit 14 and a display panel 12. The control circuit 14 receives a display signal Si from the computer 20 to control a plurality of pixels of the display panel 12 to display corresponding images according to the received display signal Si, and the liquid crystals in the display panel 12 will be controlled to process transition (i.e., polarity inversion) when the display panel 12 displays different images to prevent the liquid crystals from gradually losing their optical rotations due to polarization. When the liquid crystals of the display panel 12 process polarity inversions, the brightness Lu of the display panel 12 will change. Therefore, by measuring the variations of the brightness Lu, the response time of the LCD 10 (i.e., the time required for the transition of the liquid crystals) can be obtained. The measurement system 100 is used to measure the variations of brightness Lu of the LCD 10, convert the measured brightness Lu into a digital signal D, and transmit the digital signal D to the computer 20 to enable an application program 22 executed by a central processing unit (CPU) 24 of the computer 20 to calculate the response time Tr of the LCD 10 based on the received digital signal D.

When the measurement is started, the computer 20 will send a signal to notify the measurement system 100 to start the measurement, and at the same time, the computer 20 would switch the target image to be measured according to the display signal Si, so that the liquid crystals of the display panel 12 start to invert their polarities. The communication between measurement system 100 and computer 20 can be bidirectional or unidirectional, depending on the transmission interface chosen by the user. After the measurement system 100 receives the signal from the computer 20 to start measuring, the measurement system 100 starts to measure the brightness Lu and sends the digital signal D to the computer 20. The termination of the measurement can be actively initiated by the computer 20 to notify the measurement system 100 to stop the measurement. For example, when the computer 20 receives a sufficient amount of data of the digital signal D, it will actively notify the measurement system 100 to terminate the measurement. In addition, the measurement can also be terminated when the measurement system 100 finds that the images of the display panel 12 have no longer changed, and then actively notifies the computer 20 to terminate the measurement.

Figure 2:
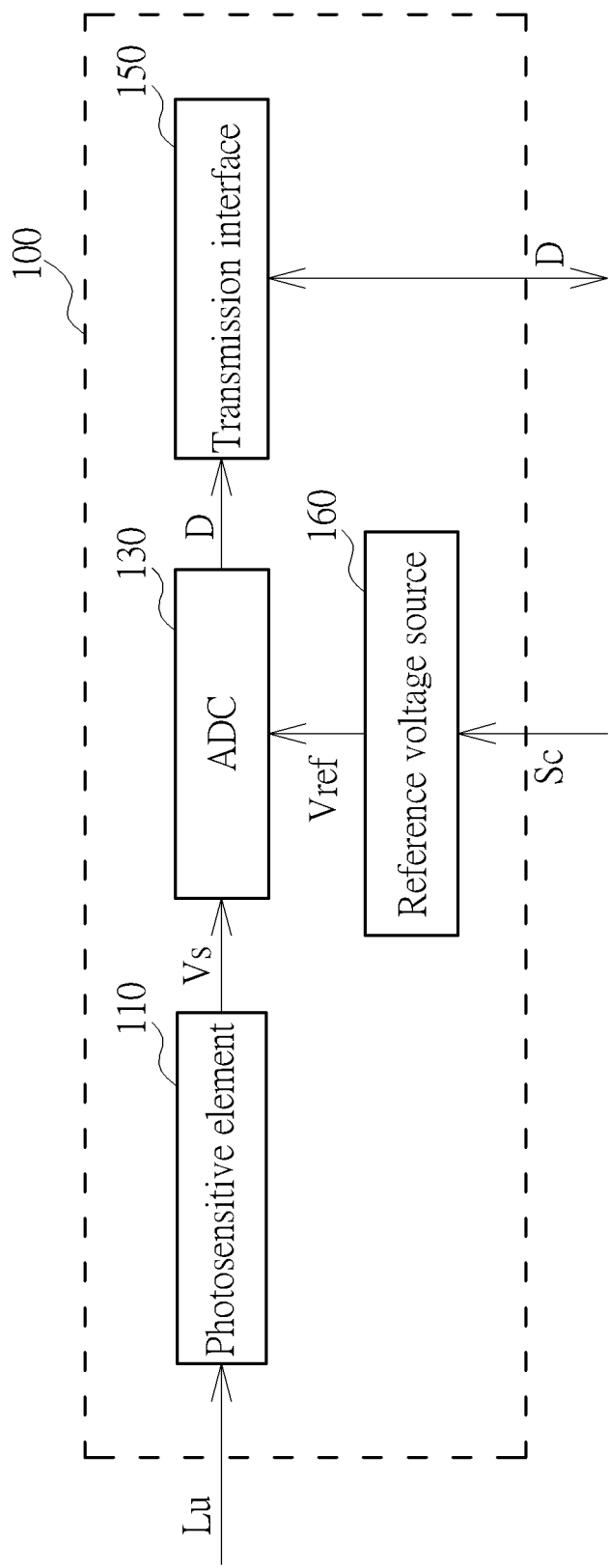
FIG. 2 is a functional block diagram of the measurement system in FIG. 1.

FIG. 2 is a functional block diagram of the measurement system 100 in FIG. 1. The measurement system 100 comprises a photosensitive element 110, an analog-to-digital converter (ADC) 130, a transmission interface 150, and a reference voltage source 160. The photosensitive element 110 is used to sense variations of the brightness Lu of the display panel 12 of the LCD 10 to generate a voltage signal Vs. The photosensitive element 110 may be a charge-coupled device (CCD), a complementary metal-oxide-semiconductor (CMOS), or other photosensitive element. The ADC 130 is used to convert the voltage signal Vs to a digital signal D. The transmission interface 150 is coupled to the computer 20 to transmit the digital signal D to the computer 20, so that the computer 20 would calculate the response time of the LCD 10 according to the received digital signal D. The reference voltage source 160 is used to provide a reference voltage Vref to the ADC 130.

The following will explain how to select each element of the measurement system 100. First, the maximum brightness that the photosensitive element 110 can detect under different operating voltages will be different. Assuming that the operating voltage range of the photosensitive element 110 is $V_{sensor\_min}$ to $V_{sensor\_max}$ Volts, the maximum brightness that the photosensitive element 110 can detect is $Lv_{sensor\_min}$ candelas when the photosensitive element 110 is powered by $V_{sensor\_min}$ volts, and the maximum brightness that the photosensitive element 110 can detect is $Lv_{sensor\_max}$ candelas when the photosensitive element 110 is powered by $V_{sensor\_max}$ volts. If the minimum and maximum of the brightness Lu of the display panel 12 are respectively $Lv_{LCD\_min}$ candelas and $Lv_{LCD\_max}$ candelas, as long as $Lv_{LCD\_min}$ and $Lv_{LCD\_max}$ are between $Lv_{sensor\_min}$ and $Lv_{sensor\_max}$ (as in Equation 1), then the photosensitive element 110 meets the requirements of the measurement system 100.

$$Lv_{sensor\_min} \leq Lv_{LCD\_min} \leq Lv_{LCD\_max} \leq Lv_{sensor\_max} \quad \text{(Equation 1)}$$

In addition, the working voltage of the photosensitive element 110 only needs to reach $V_{LCD\_max}$ volts, which is corresponding to $Lv_{LCD\_max}$ candelas. When the photosensitive element 110 is powered by $V_{LCD\_max}$ volts, the maximum brightness that it can detect is $Lv_{LCD\_max}$ candelas, and the potential of the voltage signal Vs output by the photosensitive element 110 will also be equal to $V_{LCD\_max}$ volts.

The key point of choosing the ADC 130 is a voltage extraction range and a sampling frequency of the ADC 130, and a digital resolution of the ADC 130 and a reference voltage used by the ADC 130 could be derived from the voltage extraction range of the ADC 130. It is assumed that a voltage range of the voltage signal Vs output by the photosensitive element 110 is $V_{s\_min}$ to $V_{s\_max}$ volts, and the voltage extraction range of the ADC 130 is $V_{ADC\_min}$ to $V_{ADC\_max}$ volts. Where, $V_{s\_min}$ is the minimum of the voltage signal Vs, $V_{s\_max}$ is the maximum of the voltage signal Vs, $V_{ADC\_min}$ is the minimum input voltage that the ADC 130 is rated to extract, and $V_{ADC\_max}$ is the maximum input voltage that the ADC 130 is rated to extract. As long as $V_{s\_min}$ and $v_{s\_max}$ are between $V_{ADC\_min}$ and $V_{ADC\_max}$ (as in Equation 2), it means that the voltage extraction range of the ADC 130 meets the requirements of the measurement system 100.

$$V_{ADC\_min} \leq V_{s\_min} \leq V_{s\_max} \leq V_{ADC\_max} \quad \text{(Equation 2)}$$

For different ADCs 130, they have different digital resolutions. For example, the digital resolution of the ADC 130 may be 8-bit, 10-bit, 12-bit, 16-bit, and so on. How to decide which digital resolution ADC 130 to use depends on the minimum brightness of the display panel 12 to be tested. Assuming that the minimum brightness of the display panel 12 to be tested is LV LCD LCD_min candelas, the second lowest brightness of the display panel 12 is $Lv_{LCD\_second\_min}$ candelas, and the values of the voltage signal Vs output by the photosensitive element 110 are $V_{LCD\_min}$ and $V_{LCD\_second\_min}$ volts when the values of brightness are $Lv_{LCD\_min}$ and $Lv_{LCD\_second\_min}$ respectively, the difference between $V_{LCD\_min}$ and $V_{LCD\_second\_min}$ is $\Delta V_{LCD\_min}$ (as in Equation 3).

$$\Delta V_{LCD\_min} = V_{LCD\_min} - V_{LCD\_second\_min} \quad \text{(Equation 3)}$$

$Lv_{LCD\_min}$ is the lowest brightness of the display panel 12 and is detected when all pixels of the display panel 12 have the minimum grayscale value; $Lv_{LCD\_second\_min}$ is the second lowest brightness of the display panel 12 and is detected when all pixels of the display panel 12 have the second lowest grayscale value. For example, in a system in which the display signal Si comprises eight-bit grayscale data, the range of the grayscale values of the display signal Si is 0 to 255, a total of 256 grayscales, and the minimum grayscale value and the second lowest grayscale value can be 0 and 1 respectively.

Assuming that the selected ADC 130 has a digital resolution of N bits, and the resolution of the ADC 130 is represented by $Resolution_{ADC}$, then the relationship between $Resolution_{ADC}$ and N is as follows:

$$Resolution_{ADC} = \frac{1}{2^N} \quad \text{(Equation 4)}$$

Assuming that the above difference $\Delta V_{LCD\_min}$ accounts for the ratio of ADC voltage range $V_{ADC\_min}$ to $V_{ADC\_max}$ is $Resolution_{min}$, then $Resolution_{min}$ can be expressed by the following Equation 5:

$$Resolution_{min} = \frac{\Delta V_{LCD\_min}}{abs(V_{ADC\_min} - V_{ADC\_max})} \quad \text{(Equation 5)}$$

When $Resolution_{min}$ is greater than the resolution ADC of the ADC 130, that is, when the following Equation 6 is satisfied, it means that the digital resolution of the ADC 130 meets the requirements of the measurement system 100.

$$Resolution_{min} > Resolution_{ADC} \quad \text{(Equation 6)}$$

A sampling frequency of ADC 130 depends on the response time of display panel 12 and an error acceptable to the user. Assuming that the minimum response time of display panel 12 to be measured is $ResponseTime_{LCD\_fast}$ milliseconds, the sampling frequency of ADC 130 is $SampleRate_{ADC}$ Hertz (Hz), and the minimum time interval that the ADC 130 can detect is $\Delta T_{ADC}$ milliseconds, then $\Delta T_{ADC}$ can be expressed by the following Equation 7:

$$\Delta T_{ADC} = \frac{1000}{SampleRate_{ADC}} \quad \text{(Equation 7)}$$

Assuming that the maximum error of ADC 130 due to sampling frequency is $Error_{max}$ percentage (i.e., $Error_{max}\%$), then $Error_{max}$ can be expressed by the following Equation 8:

$$Error_{max} = \frac{\Delta T_{ADC}}{ResponseTime_{LCD\_fast}} \times 100\% \quad \text{(Equation 8)}$$

As long as the maximum error $Error_{max}$ is within the maximum error range acceptable to the user, the ADC 130 can be considered applicable.

When the photosensitive element 110 is powered by $V_{LCD\_max}$ volts, the maximum and minimum of the voltage signal Vs output by the photosensitive element 110 are $V_{LCD\_max}$ and $V_{LCD\_min}$ volts respectively. Assuming that the maximum voltage change of the voltage signal Vs is $\Delta V_{LCD\_max}$ volts, then $\Delta V_{LCD\_max}$ can be expressed by the following Equation 9:

$$\Delta V_{LCD\_max} = V_{LCD\_max} - V_{LCD\_min} \quad \text{(Equation 9)}$$

Because the brightness Lu of the display panel 12 will change, the measurement system 100 needs to be able to distinguish the different brightness variations of the brightness Lu. However, if the ADC 130 applies the same resolution $Resolution_{ADC}$ with the maximum voltage change $\Delta V_{LCD\_max}$ volts and minimum voltage change $\Delta V_{LCD\_min}$ volts, a problem that the ADC 130 can resolve $\Delta V_{LCD\_max}$ but could not resolve $\Delta V_{LCD\_min}$ may happen. To this end, the measurement system 100 may use an amplifying circuit to increase the voltage difference, or select the ADC 130 whose reference voltage can be adjusted, so as to change the accuracy of the measurement system 100 in resolving the voltage signal Vs.

Figure 3:
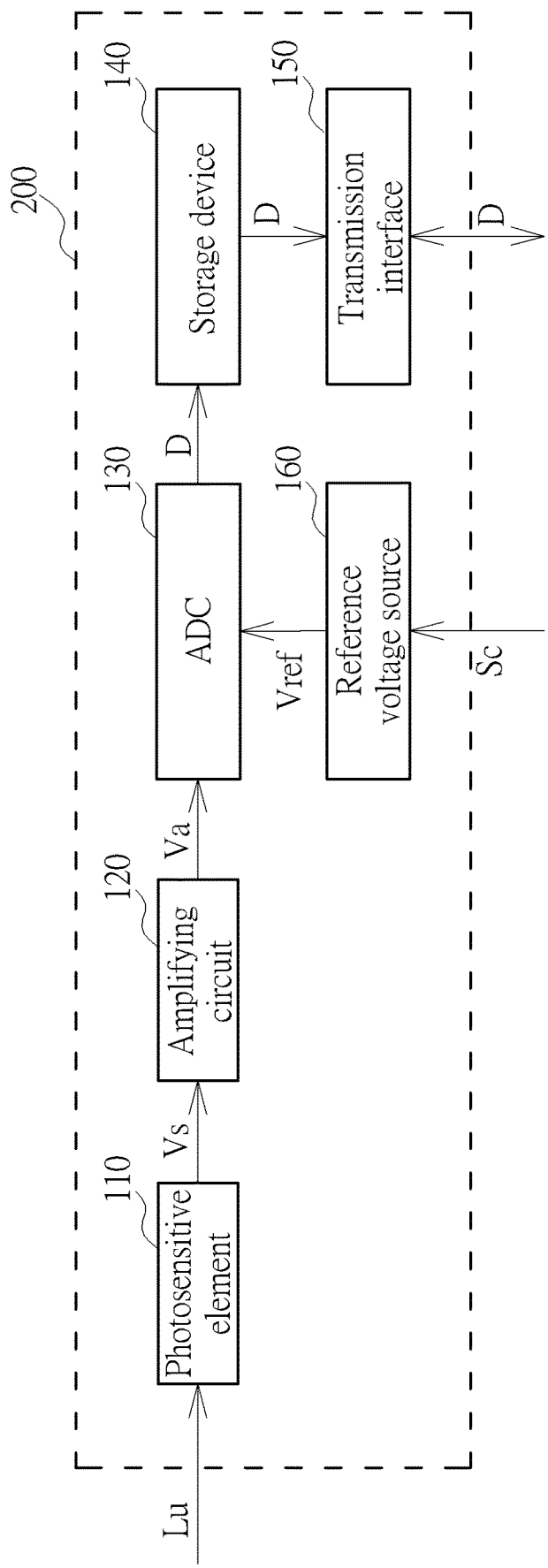
FIG. 3 is a functional block diagram of a measurement system according to another embodiment of the invention.

FIG. 3 is a functional block diagram of a measurement system 200 according to another embodiment of the present invention. The main difference between the measurement system 200 and the measurement system 100 in FIG. 2 is that the measurement system 200 further comprises an amplifying circuit 120 for amplifying the voltage signal Vs output by the photosensitive element 110 to an amplified voltage signal Va. The ADC 130 would convert the amplified voltage signal Va into the digital signal D. The measurement system 200 is suitable for the case where the aforementioned $\Delta V_{LCD\_min}$ is too small to be correctly resolved by the ADC 130. With the amplifying circuit 120, $\Delta V_{LCD\_min}$ is enlarged to $\Delta V_{LCD\_min\_modify}$, and the ADC 130, which was originally unable to correctly analyze $\Delta V_{LCD\_min}$, would be able to correctly analyze $\Delta V_{LCD\_min\_modify}$. $\Delta V_{LCD\_min\_modify}$ can be expressed by the following Equation 10:

$$\Delta V_{LCD\_min\_modify} = \Delta V_{LCD\_min} \times A_{Amplifier} \quad \text{(Equation 10)}$$

Where $A_{Amplifier}$ is the gain of amplifying circuit 120, and $A_{Amplifier}$ is greater than 1.

In addition, assuming that the above difference $\Delta V_{LCD\_min\_modify}$ accounted for the ratio of ADC voltage range $V_{ADC\_min}$ and $V_{ADC\_max}$ is $Resolution_{min\_modify}$, then $Resolution_{min\_modify}$ can be expressed by the following Equation 11:

$$Resolution_{min\_modify} = \frac{\Delta V_{LCD\_min\_modify}}{abs(V_{ADC\_min} - V_{ADC\_max})} \quad \text{(Equation 11)}$$

As long as $Resolution_{min\_modify}$ is greater than $Resolution_{ADC}$, the measurement system 200 can successfully measure the voltage signal Vs and output the digital signal D only by adding the amplifying circuit 120 without changing the photosensitive element 110 and the ADC 130.

In addition, a convertible voltage range of the ADC 130 for any voltage inputted to the ADC 130 may be set according to the reference voltage Vref. In other words, by adjusting the reference voltage Vref, the convertible voltage range of the ADC 130 would be adjusted. The reference voltage Vref may be equal to the upper limit of the convertible voltage range of the ADC 130, and be less than or equal to a maximum value $V_{ADC\_max}$ of an input voltage that the ADC 130 is rated to extract, as shown in Equation 12 below.

$$V_{ref} \leq V_{ADC\_max} \quad \text{(Equation 12)}$$

In addition, when the voltage signal Vs output by the photosensitive element 110 is not great enough to exceed the maximum value $V_{ADC\_max}$, in order to save energy and improve the accuracy of the analog-to-digital conversion of the voltage signal Vs converted by the ADC 130, the reference voltage Vref may be set lower than $V_{ADC\_max}$. When the reference voltage Vref is lowered, the convertible voltage range of the ADC 130 decreases accordingly. Since the bit length of the digital resolution of the ADC 130 does not change, the accuracy of the analog digital conversion of the ADC 130 for its input signal would be improved by narrowing the convertible voltage range of the ADC 130. Therefore, by decreasing the reference voltage Vref, the ADC 130 could resolve a smaller voltage variation of its input signal. For example, when $Resolution_{min}$ is less than $Resolution_{ADC}$, a ratio $Resolution_{ref}$ (see Equation 13) of $\Delta V_{LCD\_min}$ to the difference between the $V_{ADC\_min}$ and Vref would be greater than Resolution (Equation 14) by changing the reference voltage Vref, such that the ADC 130, which had insufficient resolution at first, would have sufficient resolution to distinguish the change in brightness Lu of the display panel 12.

$$Resolution_{ref} = \frac{\Delta V_{LCD\_min}}{abs(V_{ADC\_min} - V_{ref})} \quad \text{(Equation 13)}$$

$$Resolution_{ADC} < Resolution_{ref} \quad \text{(Equation 14)}$$

In addition, the display signal Si generally contains data of grayscale values of a plurality of pixels, and the data of the grayscale value of each pixel within a frame period is usually eight bits, representing 0 to 255 therefore a total of 256 gray levels. The greater the grayscale value of the pixel, the greater the brightness the pixel has; the less the grayscale value of the pixel, the less the brightness the pixel has. Taking all pixels of display panel 12 displaying the same grayscale as an example, the grayscale values of the display signal Si within the same frame period will be the same. The greater the grayscale value, the greater the brightness Lu of the display panel 12 will be; conversely, the less the grayscale value, the less the brightness Lu of the display panel 12 will be. In addition, a voltage level of the voltage signal Vs output by the photosensitive element 110 is positively related to the brightness Lu. Therefore, when the range of the grayscale values of the display signal Si is wider, a range of variations of the voltage level of the voltage signal Vs will be greater; and when the range of the grayscale values of the display signal Si is narrower, the range of variations of the voltage level of the voltage signal Vs will be smaller. In order to make the convertible voltage range of the ADC 130 match the range of variations of the voltage level of the voltage signal Vs, the computer 20 may dynamically adjust the reference voltage Vref according to the range of the grayscale values of the display signal Si, and then dynamically adjust the convertible voltage range of the ADC 130. Since the reference voltage Vref is equal to the upper limit of the convertible voltage range of the ADC 130, the upper limit of the convertible voltage range of the ADC 130 (i.e., the reference voltage Vref) can be set according to the maximum of the grayscale values of the display signal Si.

Figure 4:
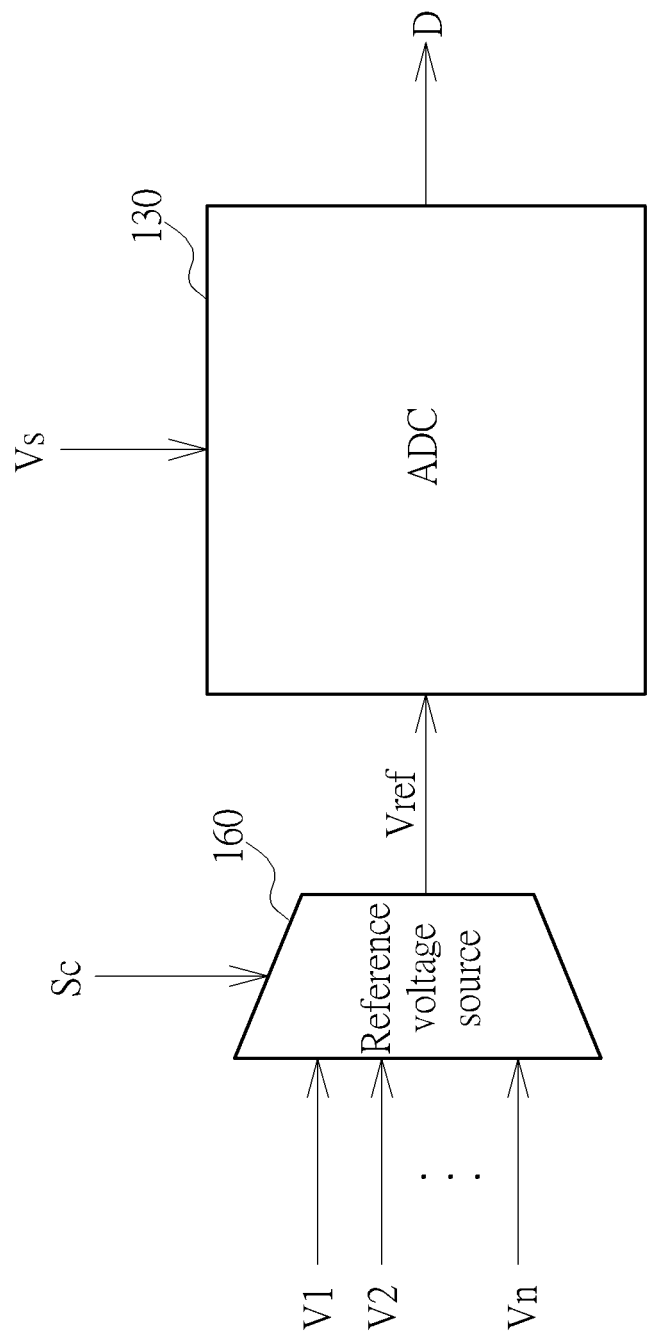
FIG. 4 is a functional block diagram of the ADC and reference voltage source of the measurement system in FIG. 2.

FIG. 4 is a functional block diagram of the ADC 130 and the reference voltage source 160 of the measurement system 100 in FIG. 2. The input terminal of the reference voltage source 160 receives a plurality of reference voltages V1 to Vn, and the voltage levels of the reference voltages V1 to Vn are different from each other. The computer 20 generates a control signal Sc according to the range of the grayscale values of the display signal Si, and the reference voltage source 160 selects the reference voltage Vref from the reference voltages V1 to Vn according to the control signal Sc and provides the selected reference voltage Vref to the ADC 130.

In addition, the transmission interface 150 may be an inter-integrated circuit (IIC or I2C) interface, a universal asynchronous receiver/transmitter (UART) interface, and a serial peripheral interface (SPI), a Universal Serial Bus (USB) interface, but the invention is not limited thereto. In addition, although different transmission interfaces have different transmission speeds, the transmission speed of the transmission interface 150 is not limited in use. For example, if the transmission data rate of the transmission interface 150 is greater than the sampling frequency of the ADC 130, the data may be uploaded to the computer 20 immediately after the ADC 130 receives the data. Even if the transmission data rate of the transmission interface 150 is less than the sampling frequency of the ADC 130, the measurement system 200 may further comprise a storage device 140 to temporarily store the data of the digital signal D. Later, the data of the digital signal D may be read from the storage device 140 and then transmitted to the computer 20.

Figure 5:
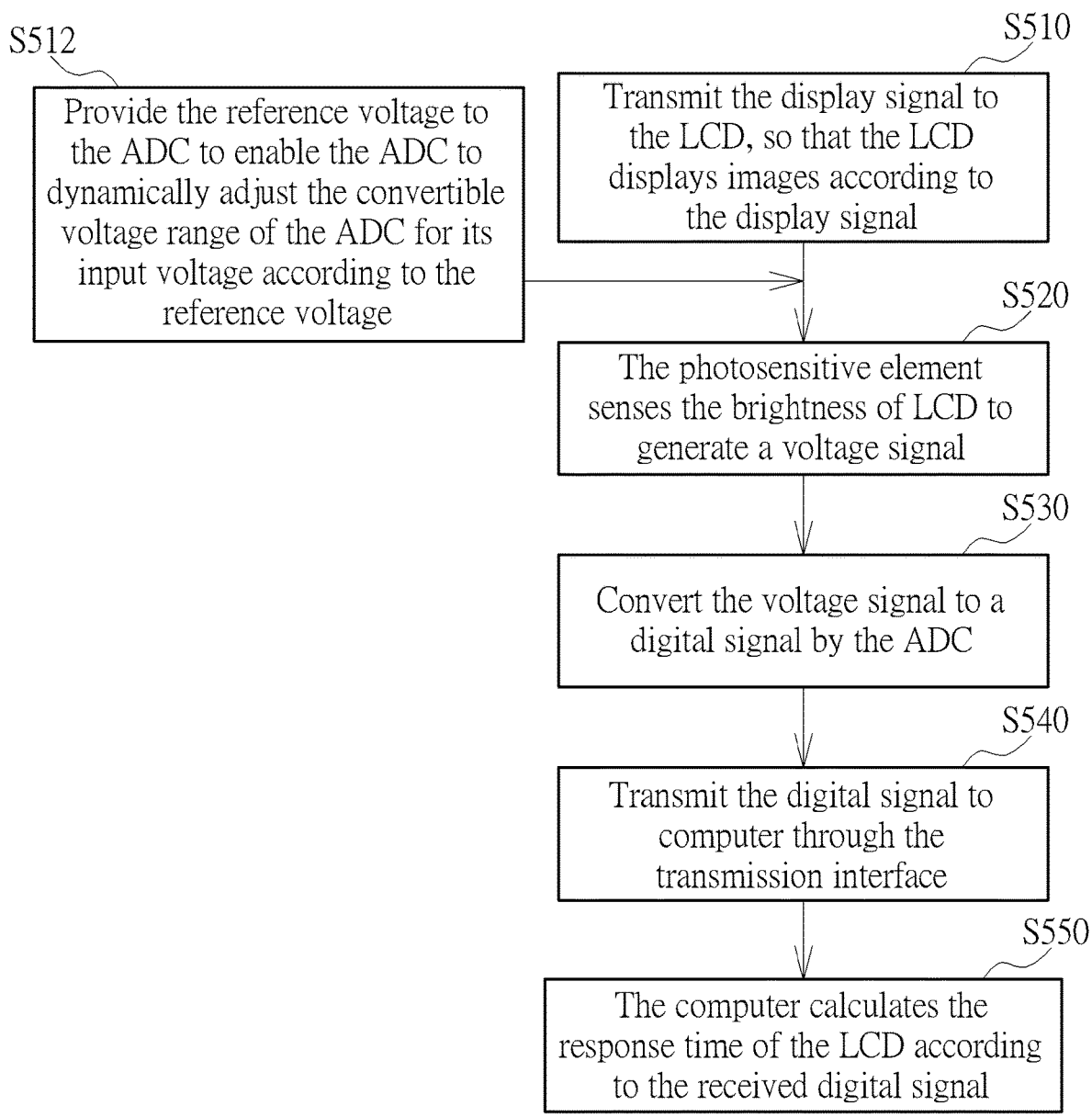
FIG. 5 is a flowchart of a method for measuring the response time of the LCD in FIG. 1 according to an embodiment of the present invention.

FIG. 5 is a flowchart of a method 500 for measuring the response time of the LCD 10 in FIG. 1 according to an embodiment of the present invention. The method 500 comprises the following steps:

Step S510: transmitting the display signal Si to the LCD 10 to drive the LCD 10 to display images according to the display signal Si;

Step S512: providing the reference voltage Vref to the ADC 130 to drive the ADC 130 to dynamically adjust the convertible voltage range of the ADC 130 for any voltage inputted to the ADC 130 according to the reference voltage Vref;

Step S520: sensing the brightness Lu of the display panel 12 of the LCD 10 by the photosensitive element 110 to generate the voltage signal Vs;

Step S530: converting the voltage signal Vs into the digital signal D by the ADC 130;

Step S540: transmitting the digital signal D to the computer 20 through the transmission interface 150; and Step S550: calculating the response time Tr of the LCD 10 by the computer 20 according to the received digital signal D.

In step S530, the voltage signal Vs can be amplified into an amplified voltage signal Va through the amplifying circuit 120, and then the ADC 130 converts the amplified voltage signal Va into a digital signal D. Alternatively, the voltage signal Vs is directly converted to the digital signal D through the ADC 130.

In summary, the measurement system of the present invention may determine a voltage level of the reference voltage provided to the ADC based on the range of the grayscale values of the display signal sent to the LCD, and dynamically adjust the convertible voltage range of the ADC for its input signal. Accordingly, the accuracy of analog-to-digital conversion of the ADC can be adjusted dynamically.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for measuring a response time of a liquid crystal display (LCD), the method comprising:
    transmitting a display signal to the LCD to drive the LCD to display images according to the display signal;
    a photosensitive element sensing variations of brightness of a display panel of the LCD to generate a voltage signal;
    converting the voltage signal into a digital signal by an analog-to-digital converter (ADC);
    a reference voltage source providing a reference voltage to the ADC to drive the ADC to dynamically adjust a convertible voltage range of the ADC for any voltage inputted to the ADC according to the reference voltage;
    transmitting the digital signal to a computer through a transmission interface; and
    the computer calculating the response time of the LCD according to the digital signal.

2. The method of claim 1 further comprising:
    adjusting the reference voltage according to a range of grayscale values of the display signal.

3. The method of claim 2, wherein adjusting the reference voltage according to the range of the grayscale values of the display signal comprises:
    setting an upper limit of the convertible voltage range according to a maximum value of the grayscale values of the display signal.

4. The method of claim 1, wherein converting the voltage signal into the digital signal by the ADC comprises:
    converting the voltage signal into an amplified signal by an amplifying circuit, and then converting the amplified signal into the digital signal by the ADC.

5. The method of claim 1, further comprising:
    generating a control signal according to a range of grayscale values of the display signal; and
    the reference voltage source selecting the reference voltage from a plurality of reference voltages according to the control signal.

6. The method of claim 1, wherein when a range of grayscale values of the display signal is a first range, the reference voltage is a first reference voltage, and the convertible voltage range is a first convertible voltage range;
    when the range of the grayscale values of the display signal is a second range, the reference voltage is a second reference voltage, and the convertible voltage range is a second convertible voltage range; and the first range is greater than the second range, the first reference voltage is greater than the second reference voltage, and the first convertible voltage range is greater than the second convertible voltage range.

7. The method of claim 1, further comprising:

storing data of the digital signal in a storage device before transmitting the digital signal to the computer through the transmission interface; and reading the data of the digital signal from the storage device.

8. A measurement system for measuring a response time of a liquid crystal display (LCD), the LCD displaying images according to a display signal, the measurement system comprising:

a photosensitive element for sensing variations of brightness of a display panel of the LCD to generate a voltage signal;

an analog-to-digital converter (ADC) for converting the voltage signal into a digital signal;

a reference voltage source for providing a reference voltage to the ADC to drive the ADC to dynamically adjust a convertible voltage range of the ADC for any voltage inputted to the ADC according to the reference voltage; and a transmission interface for transmitting the digital signal to a computer to trigger the computer to calculate the response time of the LCD according to the digital signal.

9. The measurement system of claim 8, wherein the reference voltage is adjusted according to a range of grayscale values of the display signal.

10. The measurement system of claim 9, wherein an upper limit of the convertible voltage range is set according to a maximum value of the grayscale values of the display signal.

11. The measurement system of claim 8, wherein the computer generates a control signal according to a range of grayscale values of the display signal, and the reference voltage source selects the reference voltage from a plurality of reference voltages according to the control signal.

12. The measurement system of claim 8, wherein when a range of grayscale values of the display signal is a first range, the reference voltage is a first reference voltage, and the convertible voltage range is a first convertible voltage range;

when the range of the grayscale values of the display signal is a second range, the reference voltage is a second reference voltage, and the convertible voltage range is a second convertible voltage range; and the first range is greater than the second range, the first reference voltage is greater than the second reference voltage, and the first convertible voltage range is greater than the second convertible voltage range.

13. The measurement system of claim 8 further comprising a storage device for storing data of the digital signal.

14. A measurement system for measuring a response time of a liquid crystal display (LCD), the LCD displaying images according to a display signal, the measurement system comprising:

a photosensitive element for sensing variations of brightness of a display panel of the LCD to generate a voltage signal;

an amplifying circuit for amplifying the voltage signal into an amplified voltage signal;

an analog-to-digital converter (ADC) for converting the amplified voltage signal into a digital signal;

a reference voltage source for providing a reference voltage to the ADC to drive the ADC to dynamically adjust a convertible voltage range of the ADC for any voltage inputted to the ADC according to the reference voltage; and a transmission interface for transmitting the digital signal to a computer to trigger the computer to calculate the response time of the LCD according to the digital signal.

15. The measurement system of claim 14, wherein the reference voltage is adjusted according to a range of grayscale values of the display signal.

16. The measurement system of claim 15, wherein an upper limit of the convertible voltage range is set according to a maximum value of the grayscale values of the display signal.

17. The measurement system of claim 14, wherein the computer generates a control signal according to a range of grayscale values of the display signal, and the reference voltage source selects the reference voltage from a plurality of reference voltages according to the control signal.

18. The measurement system of claim 14, wherein when a range of grayscale values of the display signal is a first range, the reference voltage is a first reference voltage, and the convertible voltage range is a first convertible voltage range;

when the range of the grayscale values of the display signal is a second range, the reference voltage is a second reference voltage, and the convertible voltage range is a second convertible voltage range; and the first range is greater than the second range, the first reference voltage is greater than the second reference voltage, and the first convertible voltage range is greater than the second convertible voltage range.

19. The measurement system of claim 14 further comprising a storage device for storing data of the digital signal.

* * * * *